United States Patent
Leu et al.

(10) Patent No.: US 6,991,359 B2
(45) Date of Patent: Jan. 31, 2006

(54) SURFACE LIGHT SOURCE AND LIGHT GUIDE PLATE HAVING DIFFERENTLY CONFIGURED DOTS

(75) Inventors: Charles Leu, Fremont, CA (US); Ga-Lane Chen, Fremont, CA (US); Tai-Cheng Yu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 47 days.

(21) Appl. No.: 10/740,234

(22) Filed: Dec. 17, 2003

(65) Prior Publication Data

US 2004/0130883 A1 Jul. 8, 2004

(30) Foreign Application Priority Data

Dec. 17, 2002 (TW) .............................. 91136344 A

(51) Int. Cl.
    *F21V 7/04* (2006.01)
(52) U.S. Cl. ........................ 362/624; 362/346; 362/348
(58) Field of Classification Search ................ 362/31, 362/331, 339, 26, 330, 336, 346, 347, 348, 362/600, 602, 606–613, 615, 617, 618, 619, 362/622, 627; 349/61, 62, 64; 385/129
See application file for complete search history.

(56) References Cited

U.S. PATENT DOCUMENTS

| | | | | |
|---|---|---|---|---|
| 5,134,549 A | * | 7/1992 | Yokoyama | 708/146 |
| 5,408,388 A | * | 4/1995 | Kobayashi et al. | 362/31 |
| 5,521,797 A | * | 5/1996 | Kashima et al. | 362/31 |
| 5,550,676 A | * | 8/1996 | Ohe et al. | 359/599 |
| 5,921,651 A | * | 7/1999 | Ishikawa | 362/31 |
| 5,949,505 A | * | 9/1999 | Funamoto et al. | 349/65 |
| 5,951,138 A | | 9/1999 | Ishikawa | |
| 6,345,899 B1 | * | 2/2002 | Ohkawa et al. | 362/31 |
| 6,412,968 B1 | * | 7/2002 | Ohkawa | 362/26 |
| 6,522,373 B1 | | 2/2003 | Hira et al. | |
| 6,710,829 B2 | * | 3/2004 | Liao | 349/65 |
| 6,727,963 B1 | * | 4/2004 | Taniguchi et al. | 349/65 |

* cited by examiner

*Primary Examiner*—Stephen Husar
*Assistant Examiner*—Hargobind S. Sawhney
(74) *Attorney, Agent, or Firm*—Wei Te Chung

(57) ABSTRACT

A surface light source (3, 4, 5) includes a light guide plate (32, 42, 52), which defines an incident surface (321, 421, 521), an emitting surface and a bottom surface (323, 423, 523) opposite to the emitting surface; and a light source (31, 41, 51) adjacent to the incident surface of the light guide plate for radiating light beams into the light guide plate through the incident surface. A multiplicity of generally rectangular dots (328, 428, 528) and generally circular dots (329, 429, 529) is formed on the bottom surface of the light guide plate. The rectangular and circular dots reflect and scatter the light beams in directions toward the emitting surface. The rectangular dots are distributed on the bottom surface corresponding to lower luminance areas of the light guide plate, so that the luminance over the whole emitting surface of the light guide plate is uniform.

14 Claims, 3 Drawing Sheets

SURFACE LIGHT SOURCE AND LIGHT GUIDE PLATE HAVING DIFFERENTLY CONFIGURED DOTS

BACKGROUND OF THE INVENTION

1. Field of the Invention

The present invention relates to a surface light source used in a liquid crystal display (LCD), and particularly to a surface light source and a light guide plate used therein having uniform luminance.

2. Prior Art

In general, LCDs have two main advantages in comparison with cathode ray tubes (CRTs): LCDs are thin, and have low power consumption. It has been said that LCDs might one day completely replace CRT display devices, and LCDs have aroused great interest in many industries in recent times. In general, an LCD needs a surface light source to provide even light for a clear display.

A surface light source comprises a light source and a light guide plate. The light source may be a linear light source, or one or more point light sources. The light guide plate has an end face through which light is introduced, and two opposite major faces one of which functions as an emission face. The performance of the surface light source greatly depends on the characteristics of the light guide plate employed therein.

A light guide plate functions to change a direction of propagation of light beams emitted from the light source and introduced into the light guide plate, from a direction roughly parallel to the emission face of the light guide plate to a direction perpendicular to the emission face. That is, the light guide plate effectively changes the linear or point light source(s) into a surface light source, for evenly illuminating a whole display screen of the LCD. The light guide plate comprises a plurality of scattering dots disposed on the bottom surface, for eliminating total internal reflection of light beams in the light guide plate. That is, the scattering dots diffuse the light beams, thereby improving the uniformity of brightness of the light guide plate and enhancing the optical characteristics of the LCD. Different LCDs require scattering dots having different shapes, sizes, and distribution densities depending on the different uses to which the LCDs are put.

FIG. 5 shows a conventional surface light source 10, which comprises a light guide plate 120 and a linear light source 110 adjacent to one side of the light guide plate 120. The light guide plate 120 generally defines two so-called dark areas 130 at two corners thereof adjacent to the light source 110. This is due to the linear light source 110 providing uneven illumination, the linear light source 110 being brightest along a main middle portion thereof.

FIG. 6 shows another conventional surface light source 20. The surface light source 20 comprises a light guide plate 220, three aligned light emitting diodes (LEDs) 210 adjacent one side of the light guide plate 220, and a reflector (not shown). Each LED 210 emits light beams over a limited predetermined range of angles, and the light beams enter the light guide plate 220 with uneven distribution. As a result, four dark areas 230 are defined in the light guide plate 20. The luminance of the four dark areas 230 is less than that of a remaining main area of the light guide plate 20. The surface light source 20 cannot attain uniformity of light beams exiting therefrom.

A new surface light source and a light guide plate for the surface light source which overcome the above-mentioned disadvantages are desired.

SUMMARY OF THE INVENTION

An object of the present invention is to provide a surface light source having uniform luminance.

Another object of the present invention is to provide a light guide plate used in a surface light source, the light guide plate having uniform luminance.

To achieve the above objects, a surface light source includes a light guide plate and a light source. The light guide plate defines a light incident surface, a light emitting surface, and a bottom surface opposite to the light emitting surface. The light source is disposed beside the light incident surface of the light guide plate, for radiating light beams into the light guide plate through the light incident surface. A multiplicity of generally rectangular dots and generally circular dots is formed on the bottom surface of the light guide plate. The rectangular dots and circular dots reflect and scatter the light beams in directions toward the light emitting surface. The rectangular dots are distributed on the bottom surface corresponding to lower luminance areas of the light guide plate, so that the luminance of the light guide plate is uniform over the whole light emitting surface.

Other objects, advantages and novel features of the invention will become more apparent from the following detailed description when taken in conjunction with the accompanying drawings.

DETAILED DESCRIPTION OF THE PREFERRED EMBODIMENTS

Hereinafter, preferred embodiments of the present invention will be explained in detail with reference to the accompanying drawings.

Figure 1:
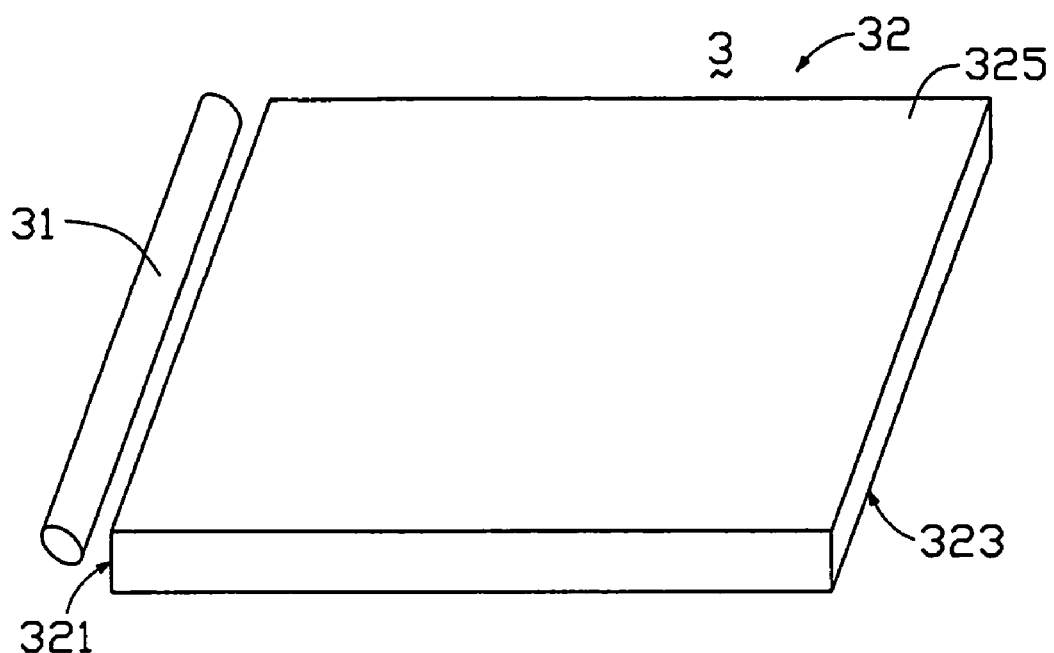
FIG. 1 is an exploded, isometric view of a surface light source in accordance with a first embodiment of the present invention.
Figure 2:
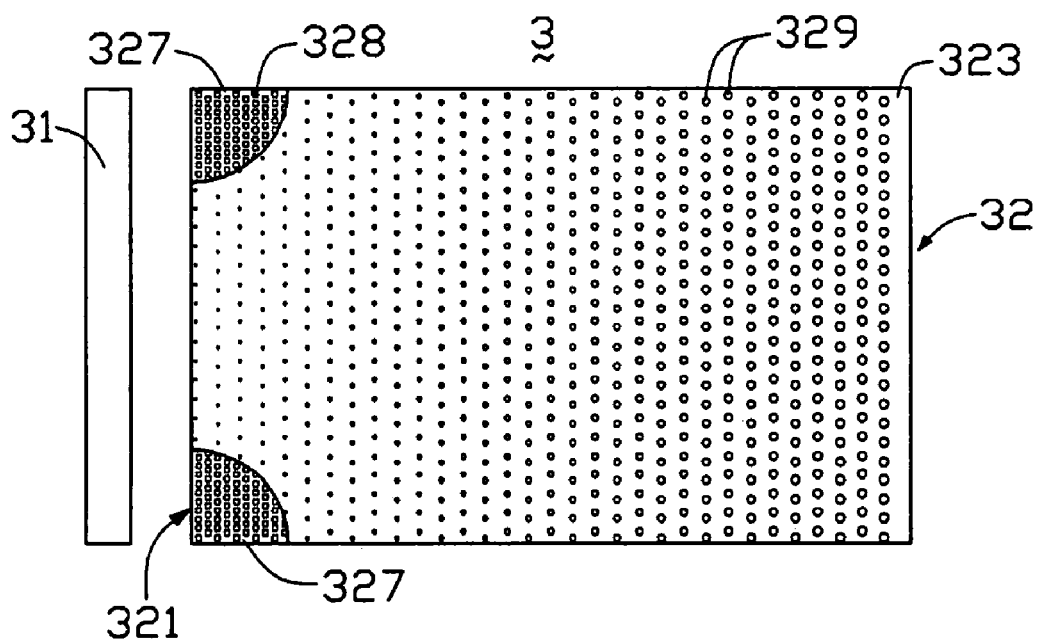
FIG. 2 is a bottom elevation of the surface light source of FIG. 1.

As shown in FIG. 1, a surface light source 3 in accordance with the first embodiment of the present invention comprises a light guide plate 32, and a light source 31 disposed adjacent to the light guide plate 32. The light source 31 is a linear light source such as a cold cathode fluorescence lamp (CCFL), and emits light beams to the light guide plate 32.

The light guide plate 32 defines a light emitting surface 325, a bottom surface 323 opposite to the light emitting surface 325, and a light incident surface 321 perpendicular to the light emitting surface 325 and the bottom surface 323. The light guide plate 32 is rectangular, square or another shape, and is made from a transparent glass or synthetic resin. Various kinds of highly transparent synthetic resins may be used, such as acrylic resin, polycarbonate resin, vinyl chloride resin, etc.

A large number of generally rectangular scattering dots 328 and generally circular scattering dots 329 is disposed on the bottom surface 323, for eliminating total internal reflection of the light beams in the light guide plate 32. That is, light beams incident on the light guide plate 32 are reflected and scattered at the rectangular and circular scattering dots 328, 329 in directions toward the light emitting surface 325.

The light source 31 is disposed adjacent to the light incident surface 321 of the light guide plate 32, and emits light beams into the light guide plate 32 through the light incident surface 321. Generally, the intensity of the light beams emitted from the light source 31 decreases from a middle area (not labeled) of the light source 31 to two opposite ends (not labeled) of the light source 31. Therefore, light beams in the light guide plate 32 have different intensity distributions, defining two lower luminance areas 327 at two corners of the light guide plate 32 adjacent to the light source 31.

The rectangular scattering dots 328 are distributed on two corners of the bottom surface 323 of the light guide plate 32 corresponding to the lower luminance areas 327, and the circular scattering dots 329 are distributed on a remaining main area of the bottom surface 323. Generally, the intensity of light beams emitted from the light source 31 decreases with increasing distance away from the light source 31. Therefore, sizes of the rectangular scattering dots 328 and the circular scattering dots 329 progressively increase with increasing distance away from the light source 31. Alternatively, distribution densities of the rectangular and circular scattering dots 328, 329 can be varied. That is, a number of uniformly sized rectangular scattering dots 328 per unit area and a number of uniformly sized circular scattering dots 329 per unit area can progressively increase with increasing distance away from the light source 31. Either of the sizing configuration or the distribution density configuration results in the distribution of intensity of the illuminating light (i.e., back-lighting luminance) being uniform over the whole light emitting surface 325 of the light guide plate 32. Preferably, the rectangular scattering dots 328 and the circular scattering dots 329 are formed so that the sizes thereof increase at an exponential rate in relation to a distance from the light incident surface 321. The exponential rate for the rectangular scattering dots 328 may or may not be the same as the exponential rate for the circular scattering dots 329. Alternatively, a number of uniformly sized rectangular scattering dots 328 per unit area and a number of uniformly sized circular scattering dots 329 per unit area can each increase at an exponential rate in relation to a distance from the light incident surface 321.

Figure 3:
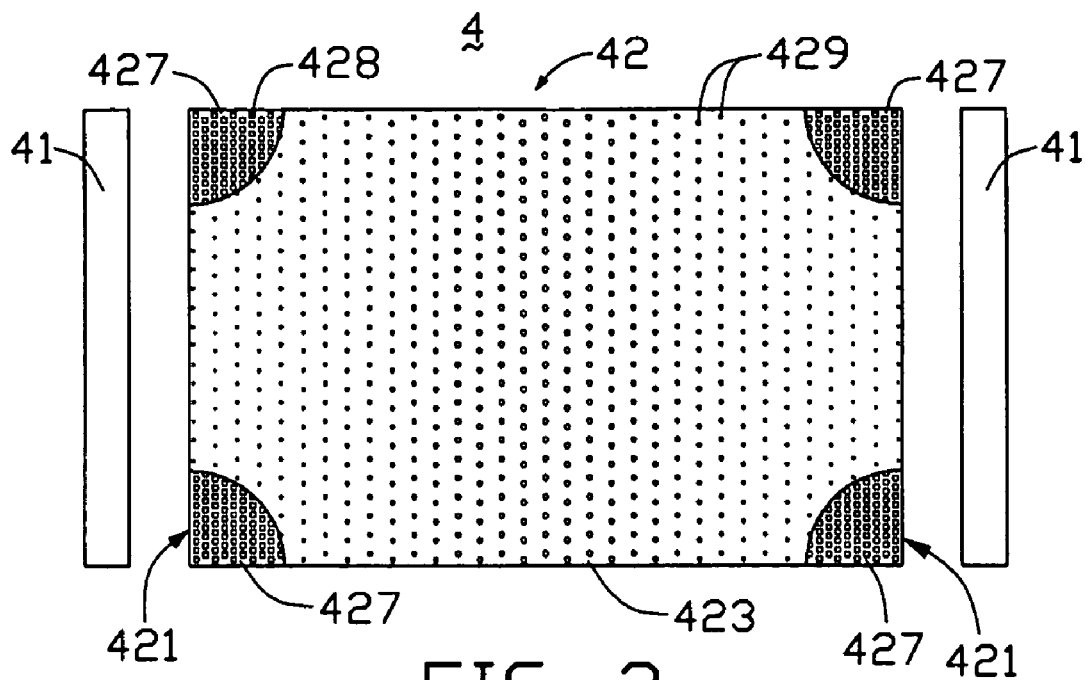
FIG. 3 is an exploded, bottom elevation of a surface light source in accordance with a second embodiment of the present invention.

A surface light source 4 in accordance with the second embodiment of the present invention is shown in FIG. 3. The surface light source 4 includes a light guide plate 42, and two light sources 41 disposed adjacent to two opposite sides of the light guide plate 42 respectively. The light sources 41 are linear light sources, such as cold cathode fluorescent lamps (CCFLs).

The light guide plate 42 comprises a light emitting surface (not labeled), a bottom surface 423 opposite to the light emitting surface, and two light incident surfaces 421 opposite to each other and perpendicular to the light emitting surface and the bottom surface 423. A large number of generally rectangular scattering dots 428 and generally circular scattering dots 429 is disposed on the bottom surface 423, for eliminating total internal reflection of light beams in the light guide plate 42. That is, light beams incident on the light guide plate 42 are reflected and scattered at the rectangular and circular scattering dots 428, 429 in directions toward the light emitting surface.

The light sources 41 are disposed adjacent to the light incident surfaces 421, respectively. The rectangular scattering dots 428 are distributed on four corners (not labeled) of the bottom surface 423, corresponding to four lower luminance areas 427. The circular scattering dots 429 are distributed on a remaining main area of the bottom surface 423. Generally, the intensity of light beams emitted from each light source 41 decreases with increasing distance away from the light source 41. Therefore, sizes of the rectangular scattering dots 428 and the circular scattering dots 429 progressively increase from the respective light incident surfaces 421 to a middle portion of the light guide plate 42. Alternatively, a number of uniformly sized rectangular scattering dots 428 per unit area and a number of uniformly sized circular scattering dots 429 per unit area can progressively increase from a respective light incident surface 421 to the middle portion of the light guide plate 42. Either of the sizing configuration or the increasing numbers configuration results in the intensity distribution of the illuminating light (i.e., back-lighting luminance) being uniform over the whole light emitting surface of the light guide plate 42. Preferably, the rectangular scattering dots 428 and the circular scattering dots 429 are formed so that the sizes thereof increase at an exponential rate in relation to a distance from a respective light incident surface 421. The exponential rate for the rectangular scattering dots 428 may or may not be the same as the exponential rate for the circular scattering dots 429. Alternatively, a number of uniformly sized rectangular scattering dots 428 per unit area and a number of uniformly sized circular scattering dots 429 per unit area can each increase at an exponential rate in relation to a distance from a respective light incident surface 421.

Figure 4:
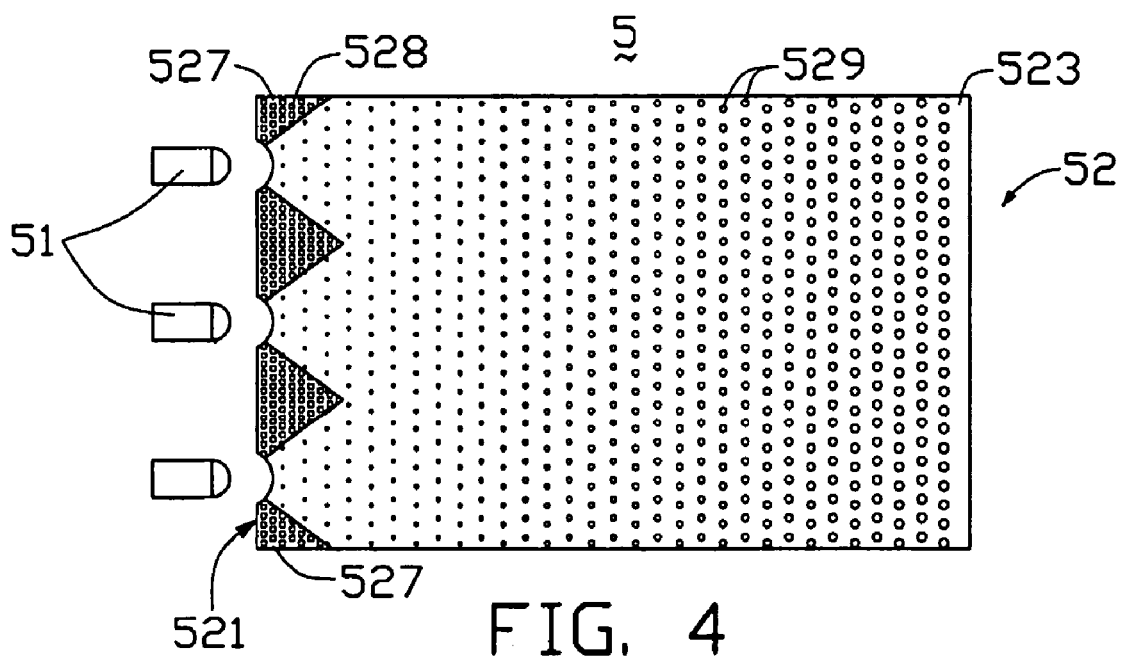
FIG. 4 is an exploded, bottom elevation of a surface light source in accordance with a third embodiment of the present invention.
Figure 5:
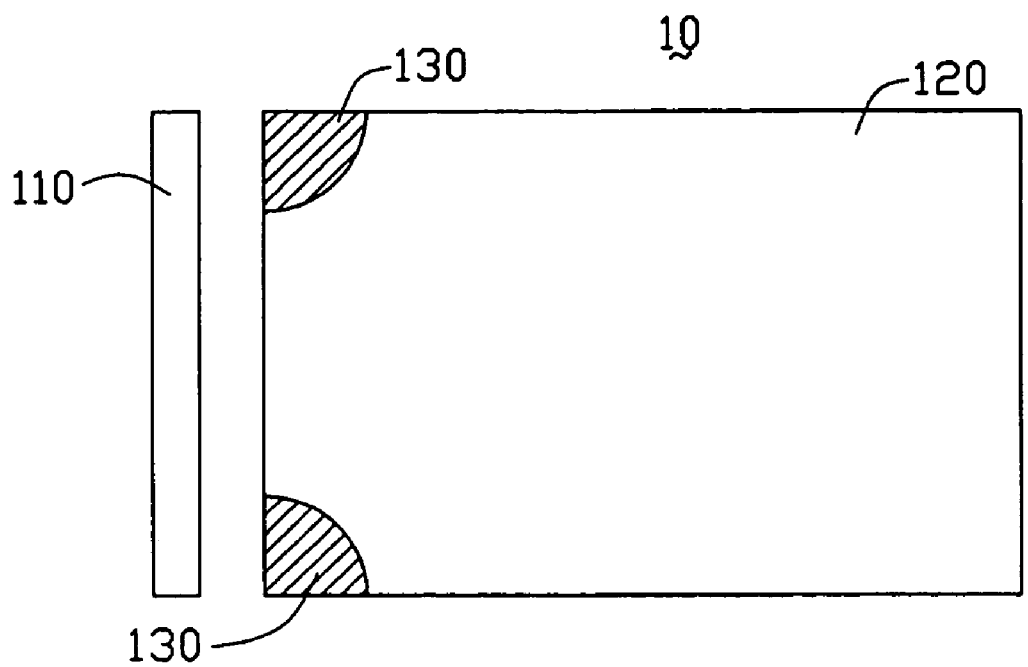
FIG. 5 is an exploded, bottom elevation of a conventional surface light source.
Figure 6:
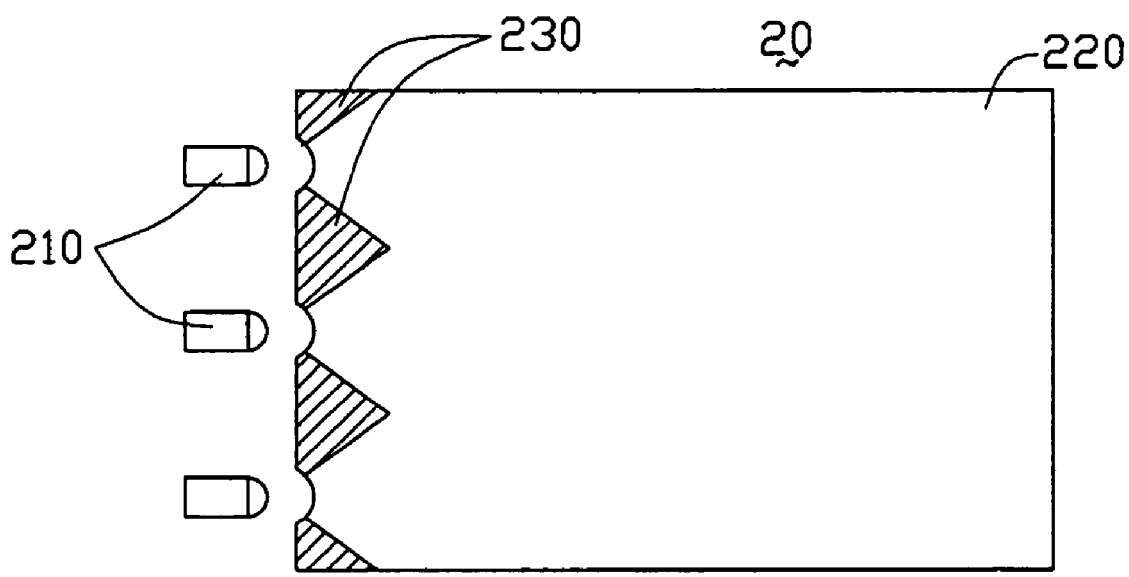
FIG. 6 is an exploded, bottom elevation of another conventional surface light source.

A surface light source 5 in accordance with the third embodiment of the present invention is shown in FIG. 4. The surface light source 5 comprises a light guide plate 52, and three aligned light sources 51 disposed adjacent to one side of the light guide plate 52. The light sources 51 are point light sources such as LEDs, and emit light beams to the light guide plate 52.

The light guide plate 52 defines a light emitting surface (not labeled), a bottom surface 523 opposite to the light emitting surface, and a light incident surface 521 perpendicular to the light emitting surface and the bottom surface 523. The light guide plate 52 is rectangular, square or another suitable shape, and is made from a transparent glass or synthetic resin. Various kinds of highly transparent synthetic resins may be used, such as acrylic resin, polycarbonate resin, vinyl chloride resin, etc.

A large number of generally rectangular scattering dots 528 and generally circular scattering dots 529 is disposed on the bottom surface 523, for eliminating total internal reflection of the light beams in the light guide plate 52. That is, light beams incident on the light guide plate 52 are reflected and scattered at the rectangular and circular scattering dots 528, 529 in directions toward the light emitting surface.

The light sources 51 are disposed adjacent to the light incident surface 521 of the light guide plate 52, and emit light beams into the light guide plate 52 through the light incident surface 521. Generally, the light sources 51 emit light beams over a limited predetermined range of angles. Therefore, light beams in the light guide plate 52 have different intensity distributions, forming a plurality of lower luminance areas 527 in the light guide plate 52 adjacent to the light source 51. The lower luminance areas 527 are beyond said limited predetermined range of angles.

The rectangular scattering dots 528 are distributed on the bottom surface 523 of the light guide plate 52 corresponding to the lower luminance areas 527, and the circular scattering dots 529 are distributed on a remaining main area of the bottom surface 523. Generally, the intensity of light beams emitted from the light sources 51 decreases with increasing distance away from the light source 51. Therefore, sizes of the rectangular scattering dots 528 and the circular scattering dots 529 progressively increase with increasing distance away from the light sources 51. Alternatively, distribution densities of the rectangular and circular scattering dots 528, 529 can be varied. That is, a number of uniformly sized rectangular scattering dots 528 per unit area and a number of uniformly sized circular scattering dots 529 per unit area can progressively increase with increasing distance away from the light source 51. Either of the sizing configuration or the distribution density configuration results in the intensity distribution of the illuminating light (i.e., back-lighting luminance) being uniform over the whole light emitting surface of the light guide plate 52. Preferably, the rectangular scattering dots 528 and the circular scattering dots 529 are formed so that the sizes thereof increase at an exponential rate in relation to a distance from the light incident surface 521. The exponential rate for the rectangular scattering dots 528 may or may not be the same as the exponential rate for the circular scattering dots 529. Alternatively, a number of uniformly sized rectangular scattering dots 528 per unit area and a number of uniformly sized circular scattering dots 529 per unit area can each increase at an exponential rate in relation to a distance from the light incident surface 521.

Each surface light source 3, 4, 5 of the present invention has the advantage of uniform luminance over the whole light emitting surface of the light guide plate 32, 42, 52 by way of the cooperation of the rectangular scattering dots 328, 428, 528 and the circular scattering dots 329, 429, 529. In particular, the rectangular scattering dots 328, 428, 528 disposed on the bottom surface 323, 423, 523 of the light guide plate 32, 42, 52 at the lower luminance areas 327, 427, 527 compensate for the relatively few light beams emitted from the light source(s) 31, 41, 51 that reach the lower luminance areas 327, 427, 527.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A surface light source comprising:
   a light guide plate defining an incident surface, an emitting surface and a bottom surface opposite to the emitting surface; and
   a light source adjacent to the incident surface of the light guide plate for radiating light beams into the light guide plate through the incident surface;
   wherein a plurality of generally circular and generally rectangular dots is formed on the bottom surface of the light guide plate, for reflecting and scattering light beams in directions toward the emitting surface; and
   the rectangular dots are distributed on the bottom surface corresponding to one or more lower luminance areas of the light guide plate, whereby luminance over the whole emitting surface of the light guide plate is substantially uniform.

2. The surface light source of claim 1, wherein the light source is a linear light source.

3. The surface light source of claim 2, wherein the rectangular dots are distributed on two corners of the bottom surface adjacent to the light source, corresponding to two lower luminance areas of the light guide plate.

4. The surface light source of claim 1, wherein the light source is a point light source emitting light beams over a limited range of angles.

5. The surface light source of claim 4, wherein the rectangular dots are distributed on the bottom surface corresponding to two lower luminance areas of the light guide plate beyond said limited range of angles.

6. The surface light source of claim 1, wherein sizes of the dots progressively increase with increasing distance away from the incident surface.

7. The surface light source of claim 6, wherein the sizes of the dots increase at an exponential rate in relation to a distance from the incident surface.

8. The surface light source of claim 1, wherein distribution densities of the rectangular dots per unit area and circular dots per unit area progressively increase with increasing distance away from the incident surface.

9. The surface light source of claim 8, wherein each of the distribution densities of the rectangular dots per unit area and circular dots per unit area increase at an exponential rate in relation to a distance from the incident surface.

10. A light guide plate for receiving light beams from a light source adjacent to an incident surface of the light guide plate, comprising:
    an emitting surface; and
    a bottom surface opposite to the emitting surface;
    wherein a plurality of generally circular and generally rectangular dots is formed on the bottom surface of the light guide plate, for reflecting and scattering light beams in directions toward the emitting surface; and
    the rectangular dots are distributed on the bottom surface corresponding to a lower luminance area of the light guide plate, so that luminance over the whole emitting surface of the light guide plate is substantially uniform.

11. The light guide plate of claim 10, wherein sizes of the dots increase with increasing distance away from the incident surface.

12. The light guide plate of claim 11, wherein the sizes of the dots increase at an exponential rate in relation to a distance from the incident surface.

13. The light guide plate of claim 10, wherein distribution densities of the rectangular dots per unit area and circular dots per unit area progressively increase with increasing distance away from the incident surface.

14. The light guide plate of claim 13, wherein each of the distribution densities of the rectangular dots per area and circular dots per area increase at an exponential rate in relation to a distance from the incident surface.

* * * * *